(12) United States Patent
Thompson et al.

(10) Patent No.: US 7,722,698 B2
(45) Date of Patent: May 25, 2010

(54) METHOD OF DETERMINING THE PURITY OF OXYGEN PRESENT IN AN OXYGEN-ENRICHED GAS PRODUCED FROM AN OXYGEN DELIVERY SYSTEM

(75) Inventors: Loren M. Thompson, Lapeer, MI (US); Michael P Chekal, Brighton, MI (US); Paul G Dedecker, Clinton Township, MI (US); James E. Nelson, North Branch, MI (US)

(73) Assignee: Delphi Technologies, Inc., Troy, MI (US)

( * ) Notice: Subject to any disclaimer, the term of this patent is extended or adjusted under 35 U.S.C. 154(b) by 268 days.

(21) Appl. No.: 12/070,918

(22) Filed: Feb. 21, 2008

(65) Prior Publication Data

US 2009/0211438 A1 Aug. 27, 2009

(51) Int. Cl.
*B01D 53/047* (2006.01)

(52) U.S. Cl. .................. 95/8; 95/19; 95/96; 95/130; 128/204.22

(58) Field of Classification Search .............. 95/8, 95/19, 96, 130; 128/204.18, 204.22, 205.12, 128/205.27; 73/23.2, 861
See application file for complete search history.

(56) References Cited

U.S. PATENT DOCUMENTS

| | | | |
|---|---|---|---|
| 3,280,536 A | 10/1966 | Berlin | |
| 3,675,649 A | 7/1972 | Bashm et al. | |
| 3,923,477 A | 12/1975 | Armond et al. | |
| 3,957,463 A | 5/1976 | Drissel et al. | |
| 4,013,429 A | 3/1977 | Sircar et al. | |
| 4,065,272 A | 12/1977 | Armond | |
| 4,066,423 A | 1/1978 | McGill et al. | |
| 4,129,424 A | 12/1978 | Armond | |
| 4,182,599 A | 1/1980 | Eyrick et al. | |
| 4,376,640 A | 3/1983 | Vo | |
| 4,378,982 A | 4/1983 | McCombs | |
| 4,421,531 A | 12/1983 | Dalton, Jr. et al. | |
| 4,449,990 A | 5/1984 | Tedford, Jr. | |
| 4,477,264 A | 10/1984 | Kratz et al. | |
| 4,481,944 A | 11/1984 | Bunnell | |
| 4,516,424 A | 5/1985 | Rowland | |
| 4,576,614 A | 3/1986 | Armond et al. | |
| 4,648,888 A | 3/1987 | Rowland | |
| 4,715,867 A | 12/1987 | Vo | |
| 4,758,252 A | 7/1988 | Lerner et al. | |
| 4,810,265 A | 3/1989 | Lagree et al. | |
| 4,816,039 A | 3/1989 | Krishnamurthy et al. | |
| 4,916,630 A * | 4/1990 | Miller ........................ | 702/30 |
| 4,917,710 A | 4/1990 | Haruma et al. | |
| 4,971,049 A | 11/1990 | Rotariu et al. | |
| 4,971,609 A | 11/1990 | Pawlos | |
| 5,099,837 A | 3/1992 | Russell, Sr. et al. | |

(Continued)

*Primary Examiner*—Frank M Lawrence
(74) *Attorney, Agent, or Firm*—Thomas N. Twomey

(57) ABSTRACT

A method of determining the purity of oxygen present in an oxygen-enriched gas produced from an oxygen delivery system is disclosed. The oxygen delivery system includes at least one sieve bed having a nitrogen-adsorbing material disposed therein and configured to adsorb nitrogen from a feed gas introduced into the at least two sieve beds via a pressure-swing adsorption cycle. The method includes determining a quantity of nitrogen adsorbed by the nitrogen-adsorbing material by inferring an effective volume of the at least one sieve bed based on a pressure change of the at least one sieve bed.

18 Claims, 3 Drawing Sheets

U.S. PATENT DOCUMENTS

| | | | |
|---|---|---|---|
| 5,122,164 A | 6/1992 | Hirooka et al. |
| 5,156,657 A | 10/1992 | Jain et al. |
| 5,165,397 A | 11/1992 | Arp |
| 5,203,887 A | 4/1993 | Toussaint |
| 5,228,888 A | 7/1993 | Gmelin et al. |
| 5,294,247 A | 3/1994 | Scharpf et al. |
| 5,370,112 A | 12/1994 | Perkins |
| 5,429,664 A | 7/1995 | Lee |
| 5,429,666 A | 7/1995 | Agrawal et al. |
| 5,518,526 A | 5/1996 | Baksh et al. |
| 5,531,807 A | 7/1996 | McCombs |
| 5,558,086 A | 9/1996 | Smith et al. |
| 5,578,115 A | 11/1996 | Cole |
| 5,603,315 A | 2/1997 | Sasso, Jr. |
| 5,632,268 A | 5/1997 | Ellis et al. |
| 5,660,171 A | 8/1997 | Kimm et al. |
| 5,685,318 A | 11/1997 | Elghazzawi |
| 5,704,964 A | 1/1998 | Kaneko et al. |
| 5,706,801 A | 1/1998 | Remes et al. |
| 5,755,224 A | 5/1998 | Good et al. |
| 5,755,856 A | 5/1998 | Miyake et al. |
| 5,766,310 A | 6/1998 | Cramer |
| 5,779,767 A | 7/1998 | Golden et al. |
| 5,827,358 A | 10/1998 | Kulish et al. |
| 5,858,062 A | 1/1999 | McCulloh et al. |
| 5,865,174 A | 2/1999 | Kloeppel |
| 5,871,564 A | 2/1999 | McCombs |
| 5,890,490 A | 4/1999 | Alysworth et al. |
| 5,893,944 A | 4/1999 | Dong |
| 5,906,672 A | 5/1999 | Michaels et al. |
| 5,912,426 A | 6/1999 | Smolarek et al. |
| 5,917,135 A | 6/1999 | Michaels et al. |
| 5,935,297 A | 8/1999 | Amlinger |
| 5,989,315 A | 11/1999 | Stuart et al. |
| 6,010,555 A | 1/2000 | Smolarek et al. |
| 6,045,603 A | 4/2000 | Chen et al. |
| 6,063,169 A | 5/2000 | Cramer et al. |
| 6,126,721 A | 10/2000 | Nemser et al. |
| 6,143,056 A | 11/2000 | Smolarek et al. |
| 6,152,134 A | 11/2000 | Webber et al. |
| 6,190,441 B1 | 2/2001 | Czabala et al. |
| 6,193,785 B1 | 2/2001 | Huf |
| 6,220,244 B1 | 4/2001 | McLaughlin |
| 6,245,127 B1 | 6/2001 | Kane et al. |
| 6,302,107 B1 | 10/2001 | Richey, II et al. |
| 6,344,069 B2 | 2/2002 | Smolarek et al. |
| 6,346,139 B1 | 2/2002 | Czabala |
| 6,348,082 B1 | 2/2002 | Murdoch et al. |
| 6,372,026 B1 | 4/2002 | Takemasa et al. |
| 6,394,089 B1 | 5/2002 | Cantrill et al. |
| 6,427,690 B1 | 8/2002 | McCombs et al. |
| 6,446,630 B1 | 9/2002 | Todd, Jr. |
| 6,461,410 B1 | 10/2002 | Abe et al. |
| 6,471,744 B1 | 10/2002 | Hill |
| 6,478,850 B1 | 11/2002 | Warren |
| 6,478,857 B2 | 11/2002 | Czabala |
| 6,511,526 B2 | 1/2003 | Jagger et al. |
| 6,520,176 B1 | 2/2003 | Dubois et al. |
| 6,524,370 B2 | 2/2003 | Maheshwary et al. |
| 6,536,431 B1 | 3/2003 | Simler |
| 6,547,851 B2 | 4/2003 | Warren |
| 6,551,384 B1 | 4/2003 | Ackley et al. |
| 6,558,451 B2 | 5/2003 | McCombs et al. |
| 6,622,726 B1 | 9/2003 | Du |
| 6,629,525 B2 | 10/2003 | Hill et al. |
| 6,641,644 B2 | 11/2003 | Jagger et al. |
| 6,641,645 B1 | 11/2003 | Lee et al. |
| 6,651,658 B1 | 11/2003 | Hill et al. |
| 6,675,798 B1 | 1/2004 | Tyomkin et al. |
| 6,691,702 B2 | 2/2004 | Appel et al. |
| 6,712,087 B2 | 3/2004 | Hill et al. |
| 6,712,877 B2 | 3/2004 | Cao et al. |
| 6,764,534 B2 | 7/2004 | McCombs et al. |
| 6,793,719 B2 | 9/2004 | Kim et al. |
| 6,811,590 B2 | 11/2004 | Lee et al. |
| 6,823,866 B2 | 11/2004 | Jafari et al. |
| 6,837,244 B2 | 1/2005 | Yagi et al. |
| 6,878,186 B2 | 4/2005 | Neary |
| 6,949,133 B2 | 9/2005 | McCombs et al. |
| 6,962,654 B2 | 11/2005 | Arnaud |
| 7,017,575 B2 | 3/2006 | Yagi et al. |
| 7,066,985 B2 | 6/2006 | Deane et al. |
| 7,077,133 B2 | 7/2006 | Yagi et al. |
| 7,105,038 B2 | 9/2006 | Lee et al. |
| 7,121,276 B2 | 10/2006 | Jagger et al. |
| 7,150,280 B2 | 12/2006 | Alysworth et al. |
| 7,156,900 B2 | 1/2007 | Moeller et al. |
| 7,171,963 B2 | 2/2007 | Jagger et al. |
| 7,188,621 B2 | 3/2007 | DeVries et al. |
| 7,204,249 B1 | 4/2007 | Richey, II et al. |
| 7,250,073 B2 | 7/2007 | Keefer et al. |
| 7,255,105 B2 | 8/2007 | Figley et al. |
| 7,264,647 B2 | 9/2007 | Meckes et al. |
| 7,273,051 B2 | 9/2007 | Whitley et al. |
| 7,279,029 B2 | 10/2007 | Occhialini et al. |
| 7,296,573 B2 | 11/2007 | Estes et al. |
| 7,300,497 B2 | 11/2007 | Urakami et al. |
| RE40,006 E | 1/2008 | Keefer et al. |
| 2003/0051730 A1 | 3/2003 | Thuener |
| 2003/0140924 A1 | 7/2003 | Aylsworth et al. |
| 2003/0145852 A1 | 8/2003 | Schmidt et al. |
| 2003/0196550 A1 | 10/2003 | Keefer et al. |
| 2004/0074496 A1 | 4/2004 | Hayashi et al. |
| 2005/0072423 A1 | 4/2005 | Deane et al. |
| 2005/0072426 A1 | 4/2005 | Deane et al. |
| 2005/0103341 A1 | 5/2005 | Deane et al. |
| 2005/0103342 A1 | 5/2005 | Jorczak et al. |
| 2005/0121033 A1 | 6/2005 | Starr et al. |
| 2005/0126571 A1 | 6/2005 | Jorczak et al. |
| 2005/0217668 A1 | 10/2005 | Figley et al. |
| 2005/0268913 A1 | 12/2005 | Morris et al. |
| 2005/0274381 A1 | 12/2005 | Deane et al. |
| 2006/0027235 A1 | 2/2006 | Orwig |
| 2006/0102181 A1 | 5/2006 | McCombs et al. |
| 2006/0117957 A1 | 6/2006 | McCombs et al. |
| 2006/0137522 A1 | 6/2006 | Nishimura et al. |
| 2006/0150972 A1 | 7/2006 | Mizuta et al. |
| 2006/0162565 A1 | 7/2006 | Lee |
| 2006/0169140 A1 | 8/2006 | Lomax, Jr. et al. |
| 2006/0174871 A1 | 8/2006 | Jagger et al. |
| 2006/0174872 A1 | 8/2006 | Jagger et al. |
| 2006/0174874 A1 | 8/2006 | Jagger et al. |
| 2006/0174882 A1 | 8/2006 | Jagger et al. |
| 2006/0185668 A1 | 8/2006 | Jagger et al. |
| 2006/0230924 A1 | 10/2006 | Deane et al. |
| 2006/0230929 A1 | 10/2006 | Bliss et al. |
| 2006/0230931 A1 | 10/2006 | Bliss et al. |
| 2006/0230939 A1 | 10/2006 | Bliss et al. |
| 2006/0266357 A1 | 11/2006 | McCombs et al. |
| 2006/0283325 A1 | 12/2006 | Sugano |
| 2007/0006880 A1 | 1/2007 | Smith et al. |
| 2007/0023039 A1 | 2/2007 | Ishizaki et al. |
| 2007/0056584 A1 | 3/2007 | Jagger et al. |
| 2007/0095208 A1 | 5/2007 | Baksh et al. |
| 2007/0204748 A1 | 9/2007 | Lomax, Jr. et al. |
| 2007/0214960 A1 | 9/2007 | Aylsworth et al. |
| 2007/0227354 A1 | 10/2007 | Song |
| 2007/0283807 A1 | 12/2007 | Whitley |
| 2007/0283959 A1 | 12/2007 | Rassloff |
| 2007/0289445 A1 | 12/2007 | Hua et al. |
| 2008/0000475 A1 | 1/2008 | Hill |
| 2008/0006151 A1 | 1/2008 | Baksh et al. |

* cited by examiner

METHOD OF DETERMINING THE PURITY OF OXYGEN PRESENT IN AN OXYGEN-ENRICHED GAS PRODUCED FROM AN OXYGEN DELIVERY SYSTEM

BACKGROUND

The present disclosure relates generally to oxygen delivery and, more particularly, to a method of determining the purity of oxygen present in an oxygen-enriched gas produced from an oxygen delivery system.

Oxygen delivery systems are often used to produce an oxygen-enriched gas for the user. Some oxygen delivery systems are oxygen concentrating systems including one or more gas fractionalization systems configured to separate oxygen from other components (e.g., nitrogen) in a feed gas to produce the oxygen-enriched gas. The gas fractionalization system(s), for example, may include one or more sieve beds having a nitrogen-adsorbing material disposed therein and configured to adsorb at least nitrogen from the feed gas. One technology used to adsorb nitrogen is referred to as Standard Pressure-Swing Adsorption (PSA). During PSA, nitrogen is selectively adsorbed in the nitrogen-adsorbing material due to pressure changes in the sieve beds, leaving the oxygen-enriched gas to be delivered to the user.

The purity of the oxygen-enriched gas produced by gas fractionalization systems such as those described above is often directly measured in the oxygen delivery system. For example, the oxygen delivery system may include an oxygen sensor coupled to a user conduit, a user outlet, or the like, that directly measures the purity of the oxygen present in the oxygen-enriched gas.

SUMMARY

A method of determining the purity of oxygen present in an oxygen-enriched gas produced from an oxygen delivery system is disclosed herein. The oxygen delivery system includes at least one sieve bed having a nitrogen-adsorbing material disposed therein and configured to adsorb nitrogen from a feed gas introduced into the at least one sieve bed via a pressure-swing adsorption cycle. The feed gas includes at least nitrogen and oxygen. The method includes determining a quantity of nitrogen adsorbed by the nitrogen-adsorbing material by inferring an effective volume of the at least one sieve bed based on a pressure change of the at least one sieve bed.

BRIEF DESCRIPTION OF THE DRAWINGS

Features and advantages of the present disclosure will become apparent by reference to the following detailed description and drawings, in which like reference numerals correspond to similar, though not necessarily identical components. For the sake of brevity, reference numerals or features having a previously described function may not necessarily be described in connection with other drawings in which they appear.

DETAILED DESCRIPTION

Embodiment(s) of the method disclosed herein advantageously indirectly determine the purity of oxygen present in an oxygen-enriched gas produced from an oxygen delivery system. Generally, the purity of the oxygen in the oxygen-enriched gas may be deduced from determining whether one or more sieve beds of the oxygen delivery system are contaminated. This is accomplished by determining a quantity of the nitrogen adsorbed by a nitrogen-adsorbing material disposed in the sieve beds during a PSA cycle of the PSA process. Without being bound to any theory, it is believed that the quantity of the adsorbed nitrogen is correlated to the system's ability to produce the oxygen-enriched gas at a desired purity.

The method(s) disclosed herein also advantageously provides relatively reliable oxygen purity determinations without having to employ an additional component, such as, e.g., an oxygen sensor, in the oxygen delivery system. This substantially reduces the size of the device with which the system will ultimately be incorporated, as well as its weight and/or cost. These attributes are particularly advantageous for ambulatory or other portable applications. Additionally, the absence of the oxygen sensor or other like component in the system may substantially simplify manufacture and maintenance of the system.

Figure 1:
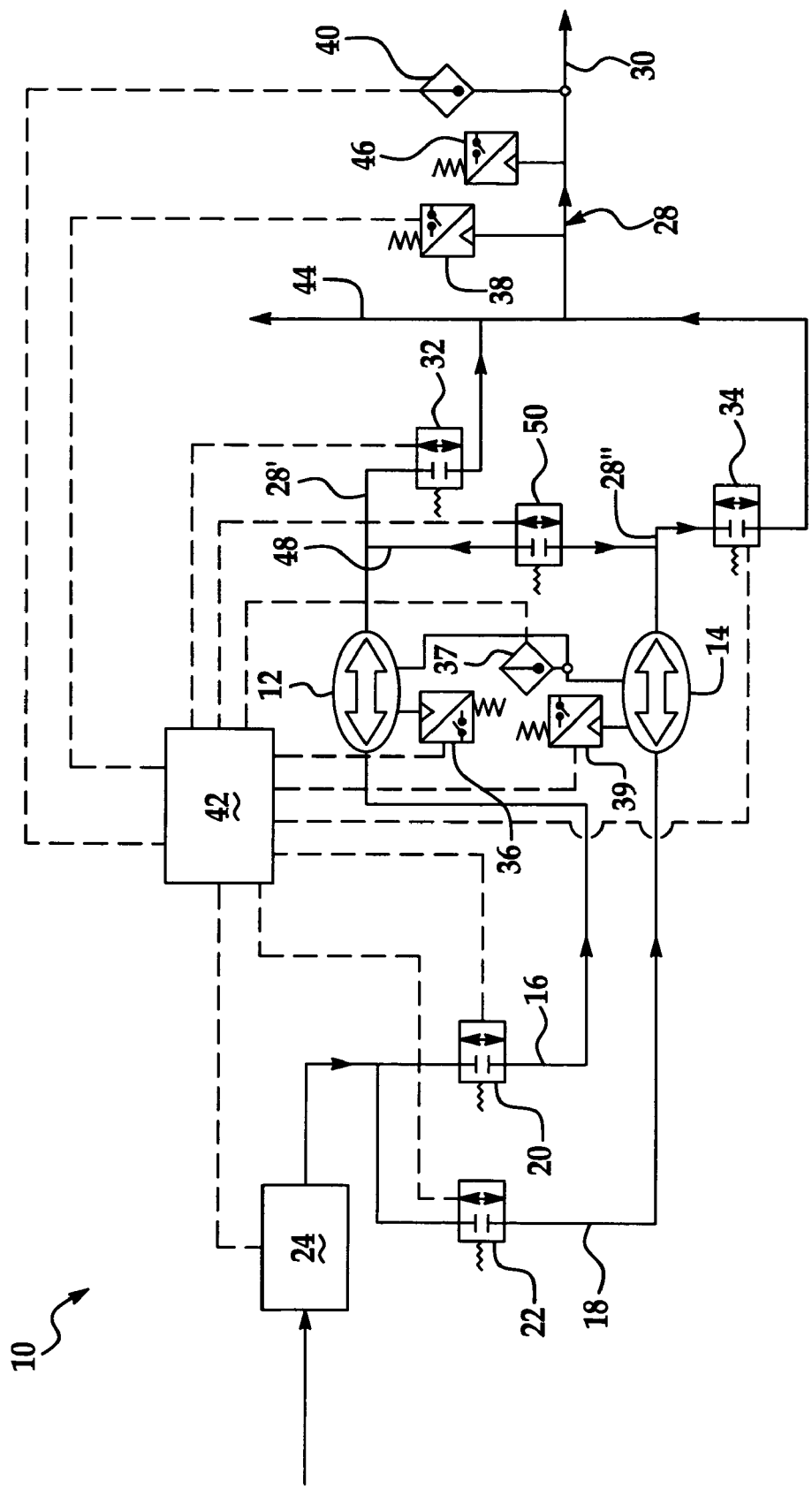
FIG. 1 is a schematic diagram of an embodiment of an oxygen delivery system including two sieve beds.

An embodiment of the oxygen delivery system used for the method disclosed herein is depicted in FIG. 1. It is to be understood that the nitrogen-adsorption process employed by the oxygen delivery system may be a pressure swing adsorption (PSA) process, and such process operates in repeating adsorption/desorption cycles.

In this embodiment, the oxygen delivery system includes at least two gas fractionalization systems. As shown in FIG. 1, the oxygen delivery system 10 includes first 12 and second 14 gas fractionalization systems, each in selective communication with a feed gas including at least oxygen and nitrogen. In a non-limiting example, the feed gas is air taken from the atmosphere immediately outside of the system 10. In an embodiment, each of the first 12 and second 14 gas fractionalization systems are configured to selectively receive the feed gas during a predetermined supply period. The first 12 and second 14 gas fractionalization systems may receive the feed gas via first 16 and second 18 supply conduits, respectively.

The first 16 and second 18 supply conduits may be configured with first 20 and second 22 supply valves (or inlet valves), respectively. In a non-limiting example, the first 20 and second 22 supply valves are two-way valves. As provided above, the nitrogen-adsorption process employed by the oxygen generating system 10 operates via cycles, where one of the first 12 or second 14 sieve beds vents waste gas (i.e. nitrogen-enriched gas/oxygen-depleted gas) to atmosphere, while the other of the first 12 or second 14 sieve beds delivers generated oxygen-enriched gas to the user. During the next cycle, the functions of the respective gas fractionalization systems 12, 14 switch. Switching is accomplished by opening the respective supply valve 20, 22 while the other of the supply valves 20, 22 remains closed. More specifically, when one of the first 12 or second 14 gas fractionalization systems is receiving the feed gas, the respective one of the first 20 or second 22 supply valves is in an open position. In this case, the feed gas is prevented from flowing to the other of the first 12 or second 14 gas fractionalization systems. In an embodiment, the opening and/or closing of the first 20 and second 22 supply valves may be controlled with respect to timing of opening and/or closing and/or with respect to the sequence in with the first 20 and second 22 supply valves are opened and/or closed.

In an embodiment, the feed gas is compressed via, e.g., a compressor 24 prior to entering the first 16 or second 18 supply conduits. In a non-limiting example, the compressor is a scroll compressor. It is to be understood, however, that compression of the feed gas may be accomplished by any suitable compression means.

After receiving the feed gas, the first 12 and second 14 gas fractionalization systems are each configured to separate at least most of the oxygen from the feed gas to produce the oxygen-enriched gas. In an embodiment, the first 12 and second 14 gas fractionalization systems are each sieve beds 12, 14, respectively, including the nitrogen-adsorbing material (e.g., zeolite) configured to adsorb at least nitrogen from the feed gas. As stated above, the nitrogen-adsorbing process employed by the sieve beds 12, 14 is a PSA process using a plurality of PSA cycles. In a non-limiting example, the oxygen-enriched gas includes a gas product having an oxygen content ranging from about 70% to about 95 vol % of the total gas product. In another non-limiting example, the oxygen-enriched gas has an oxygen content of at least 87 vol % of the total gas product.

A patient conduit 28 having a patient outlet 30 is in alternate selective fluid communication with the first and second sieve beds 12, 14. For example, the patient conduit 28 may be formed at least partially from flexible plastic tubing. In an embodiment, the patient conduit 28 is configured substantially in a "Y" shape. As such, the patient conduit 28 may have a first conduit portion 28' and a second conduit portion 28", which are in communication with the first sieve bed 12 and the second sieve bed 14, respectively, and merge together before reaching the patient outlet 30. The patient outlet 30 may be any orifice in the patient conduit 28 configured to output the substantially oxygen-enriched gas for patient use. The patient outlet 30 may additionally be configured with a nasal cannula, a respiratory mask, or any other suitable device, as desired or required.

The first conduit portion 28' and the second conduit portion 28" may be configured with a first patient valve 32 and a second patient valve 34, respectively. In an embodiment, the first 32 and the second 34 patient valves are configured as two-way valves. It is contemplated that when the oxygen-enriched gas is delivered from one of the first and second sieve beds 12, 14, to the patient conduit 28, the respective one of the first 32 or second 34 patient valves is open. Further, when the respective one of the first 32 or second 34 patient valves is open, the respective one of the first 20 or second 22 supply valves is closed. Yet further, when one of the first 32 or second 34 patient valves is open, both of the first 20 and second 22 supply valves may be closed.

In an embodiment, as shown in FIG. 1, the oxygen delivery device 10 also includes a sieve bed pressure sensor 36, 39 for the sieve beds 12, 14, respectively, and a sieve bed temperature sensor 37 configured to measure the pressure and temperature, respectively, of the first 12 and second 14 sieve beds during the PSA process. In another embodiment, a single pressure sensor may be used to measure the pressure of each of the sieve beds 12, 14, whereby the delivery device 10 may include additional equipment used for selecting the desired sieve bed that the pressure sensor is intended to measure. The device 10 further includes an ambient pressure sensor 38 and an ambient temperature sensor 40 to measure the pressure and temperature, respectively, of the ambient environment. Although sensors 38 and 40 are schematically shown inline with the user output 30, it is to be understood that these sensors may be placed in any suitable location so as to achieve readings with desirable accuracy.

The compressor 24, the first 20 and second 24 supply valves, and the first 30 and second 32 patient valves are controlled by a controller 42. The sieve bed pressure sensor 36, the sieve bed temperature sensor 37, the ambient pressure sensor 38, and the ambient temperature pressure sensor 40 measure parameters that are inputs to the controller 42. In a non-limiting example, the controller 42 is a microprocessor including a memory. As will be described in more detail below, the controller 42 receives, e.g., sieve bed pressures, and other similar variables, and uses these variables to execute one or more algorithms for controlling various components and/or processes used in the system 10. Further, based on the measurements of the variables, the controller 42 executes one or more computational algorithms to determine the purity of the oxygen in the oxygen-enriched gas.

As provided above, the PSA process selectively adsorbs at least nitrogen from the feed gas. Generally, the pressurized feed gas is introduced into one of the first 12 or the second 14 sieve beds, thereby pressurizing the respective first 12 or second 14 sieve bed. Nitrogen and possibly other components present in the feed gas are adsorbed by the nitrogen-adsorbing material disposed in the respective first 12 or second 14 sieve bed. After: a predetermined amount of time; reaching a predetermined target pressure; detection of an inhalation; and/or another suitable trigger, the pressure of the respective first 12 or second 14 sieve bed is released. At this point, the adsorbed nitrogen (and any other adsorbed components) is also released from the respective first 12 or second 14 sieve bed and is vented out of the system 10 through a vent conduit 44. It is to be understood that venting occurs after each dynamically adjusted oxygen delivery phase and after counterfilling, each of which will be described further below. The gas not adsorbed by the nitrogen-adsorbing material (i.e., the oxygen-enriched gas) is delivered to the user through the patient outlet 30.

In an embodiment, the oxygen delivery system 10 may be configured to trigger an output of a predetermined volume of the oxygen-enriched gas from the sieve bed 12 upon detection of an inhalation by the user. Detection of an inhalation may be accomplished via, e.g., a breath detection device, schematically shown as reference numeral 46 in FIG. 1. The predetermined volume, which is at least a portion of the oxygen-enriched gas produced, is output to the patient conduit 28 and to the patient outlet 30 during a respective dynamically adjusted oxygen delivery phase.

As used herein, a "masked" time or the like language may be defined as follows. Following a dynamically adjusted patient oxygen delivery phase from the first 12 or second 14 sieve bed, breath detection may be "masked" for a predetermined masking time, for example, during the dynamically adjusted oxygen delivery phase and during a predetermined amount of time following the delivery phase. It is to be understood that such predetermined masking time may be configured to prevent the triggering of another dynamically adjusted patient oxygen delivery phase before sufficient substantially oxygen-enriched gas is available from the other of the second 14 or first 12 sieve bed. As used herein, sufficient substantially oxygen-enriched gas may be a pulse having a desired oxygen content. In an embodiment, the predetermined masking time may be short in duration. As a non-limiting example, the predetermined masking time may be about 500 milliseconds in length. In an alternate embodiment, this masking time may also be dynamically adjusted, e.g., based on the average breath rate. Further, in order to accommodate a maximum breathing rate of 30 Breaths Per Minute (BPM), a maximum mask time of 2 seconds may be used, if desired.

The first 12 and second 14 sieve beds are also configured to transmit at least a portion of the remaining oxygen-enriched gas (i.e., the oxygen-enriched gas not delivered to the user during or after the masked time to the patient outlet 30), if any, to the other of the first 12 or second 14 sieve bed. This also occurs after each respective dynamically adjusted oxygen delivery phase. The portion of the remaining oxygen-enriched gas may be transmitted via a counterfill flow conduit 48. The transmission of the remaining portion of the oxygen-enriched gas from one of the first 12 or second 14 sieve beds to the other first 12 or second 14 sieve beds may be referred to as "counterfilling."

As shown in FIG. 1, the counterfill flow conduit 48 may be configured with a counterfill flow valve 50. In a non-limiting example, the counterfill flow valve 50 is a two-way valve. The counterfill flow valve 50 is opened to allow the counterfilling of the respective first 12 and second 14 sieve beds.

As provided above, the purity of oxygen present in the oxygen-enriched gas is determined by determining whether the sieve beds 12, 14 are contaminated. This is accomplished by determining a quantity (generally provided in terms of volume) of nitrogen adsorbed by the nitrogen-adsorbing material. For one sieve bed (such as, e.g., the sieve bed 12), the quantity of nitrogen is determined by inferring an effective volume of the sieve bed based on a pressure change of the sieve bed. A contaminated sieve bed (i.e., a sieve bed that does not produce the oxygen-enriched gas including oxygen with desirable purity) may be determined by observing the rate of the pressure change of the sieve bed over a period of time.

It is to be understood that the quantity of nitrogen adsorbed by the nitrogen-adsorbing material is generally affected by the sieve bed pressure and temperature. Since nitrogen tends to have a higher affinity to the nitrogen-adsorbing material than oxygen at increasing sieve bed pressures and decreasing sieve bed temperatures, at higher sieve bed pressures and lower sieve bed temperatures, a higher quantity (relative to oxygen) of nitrogen will be adsorbed by the material. The quantity of nitrogen adsorbed by the nitrogen-adsorbing material at a particular sieve bed pressure and temperature (i.e., the storing capacity of the nitrogen-adsorbing material for the nitrogen) is correlated to the effective volume of the sieve bed and, at least at different pressures, the effective volume of the sieve bed changes. The inferred effective volume may be used to determine the whether the sieve bed is contaminated, from which the purity of the oxygen present in the oxygen-enriched gas may be deduced.

An exemplary method of inferring the effective volume of one of the first 12 or second 14 sieve beds is described herein still with reference to FIG. 1. For purposes of illustration only, this embodiment will be described using sieve bed 12.

In this embodiment, when the sieve bed 12 depressurizes (e.g., to substantially ambient pressure or above or below ambient pressure, as desired) after the venting of the nitrogen-enriched gas of the PSA cycle, the effective volume of the sieve bed 12 is inferred by measuring a rate of pressure decay (between two pressure points) of the sieve bed 12. This cycle generally begins at a known pressure inside the sieve bed 12 and continues to vent the nitrogen-enriched gas to the atmosphere until substantially all of the nitrogen-enriched gas has been expelled from the system 10. The pressure of the sieve bed 12 is measured after counterfill to render the first pressure point. The second pressure point is a predetermined ratio of the first pressure point (the first pressure point is measured at a point substantially earlier in the venting portion of the PSA cycle than the second pressure point). Although two pressure points are given in this example, it is to be understood that any number of pressure points may be measured. In a non-limiting example, the second pressure point is a pre-selected percentage (e.g., about 25% or any desired percentage) of the first pressure point. The pressure decay is correlated with the effective volume of the sieve bed 12 to determine whether the sieve bed 12 is contaminated.

It is to be understood that, in an alternate embodiment, the rate of pressure rise of the sieve bed 12 may also be used to determine whether the sieve bed 12 is contaminated. A contaminated sieve bed 12 will generally have less storage capacity, and the pressure rise or decay will generally be substantially different than that of an optimum sieve bed. The pressure rise is analyzed/determined during the sieve bed 12 fill state.

As the nitrogen-enriched gas is vented, the pressure of the sieve bed 12 reduces and is measured via, e.g., the pressure sensor 36 over a period of time as venting progresses. The pressure measurements are then used to generate a sieve bed pressure curve. This sieve bed pressure curve generally follows an exponential decay of the pressure and further defines a time constant. The time constant is determined by analyzing various parameters, e.g., the time that it takes for the internal pressure of the sieve bed 12 to decay to the second pressure point. Further, the slope of the sieve bed pressure curve is another parameter that may be used to determine the time constant. It is to be understood that the time constant is proportional to the quantity of nitrogen adsorbed by the nitrogen-adsorbing material.

The time constant is generally dependent on several different factors. For example, the time constant may be dependent on at least one flow restriction during the venting of the nitrogen-adsorbed gas. Non-limiting examples of flow restrictions include at least one valve such as, e.g., supply valves 20, 22, patient valves 32, 34, and counterfill valve 50; at least one fluid communication path such as, e.g., supply conduits 16, 18, patient conduit 18, vent conduit 44, and counterfill flow conduit 48; and combinations thereof. Other factors that may affect the time constant include, but are not limited to, a peak absolute pressure of the sieve bed 12 at the onset of the venting of the PSA cycle, the quantity of nitrogen adsorbed by the nitrogen-adsorbing material at the peak absolute pressure, an ambient temperature, and a barometric (ambient) pressure.

In a non-limiting example, at the onset of the venting, the pressure ranges from about 3 psi to about 9 psi, and the peak absolute pressure of the sieve bed 12 is about 18 psi. In another non-limiting example, the peak absolute pressure may be as high as 100 psi.

A determination of whether the quantity of nitrogen adsorbed by the sieve bed 12 is sufficient to achieve the desired oxygen purity is accomplished by comparing the time constant with a predicted value. The predicted value is a time constant determined from a suitable-operating sieve bed of another oxygen delivery system. In a non-limiting example, the predicted value is determined by obtaining a plurality of pressure data points taken from good-operating or model oxygen delivery systems, where each model system is operated at different sieve bed temperatures, sieve bed pressures, and altitudes. A regression analysis is applied to the data points to generate a mathematical expression for the predicted value of the good-operating or model oxygen delivery systems.

In a non-limiting example, further regression analysis may be applied to time constant data, factor data, and oxygen production purity data gathered from oxygen delivery systems operating under various levels of bed impairment induced by environmental manipulations, e.g., such as excessive humidity. This may determine the mathematical relationship between oxygen production and changes in the measured time constant. This relationship may then be used to determine the amount of degradation, if any, that has occurred in oxygen purity of the delivered product gas. The present inventors have fortuitously found that application of this relationship ties produced oxygen purity back to the predictive time constant relationship.

The contamination state of the sieve bed is determined from the comparison of the predicted value with the time constant of the sieve bed. When the values are compared, if the predicted value exceeds the time constant (by a failure threshold, calculated based on the regression mentioned in the previous paragraph), then the quantity of nitrogen adsorbed by the sieve bed is insufficient to achieve the desired oxygen purity level and the sieve bed is considered to be contaminated. If, however, the predicted value does not exceed the time constant (by a failure threshold, calculated based on the regression mentioned in the previous paragraph), then the quantity of the nitrogen adsorbed is sufficient to achieve the desired oxygen purity level and the sieve bed is considered not to be contaminated.

In an alternate embodiment, the time constants of the two sieve beds may be averaged, and if the predicted value exceeds the averaged time constant (by a failure threshold, calculated based on the regression mentioned above), then the quantity of nitrogen adsorbed by the sieve beds is insufficient to achieve the desired oxygen purity level, and the sieve beds are considered to be contaminated. If, however, the predicted value does not exceed the averaged time constant (by a failure threshold, calculated based on the regression mentioned above), then the quantity of the nitrogen adsorbed is sufficient to achieve the desired oxygen purity level, and the sieve beds are considered not to be contaminated.

Figure 2:
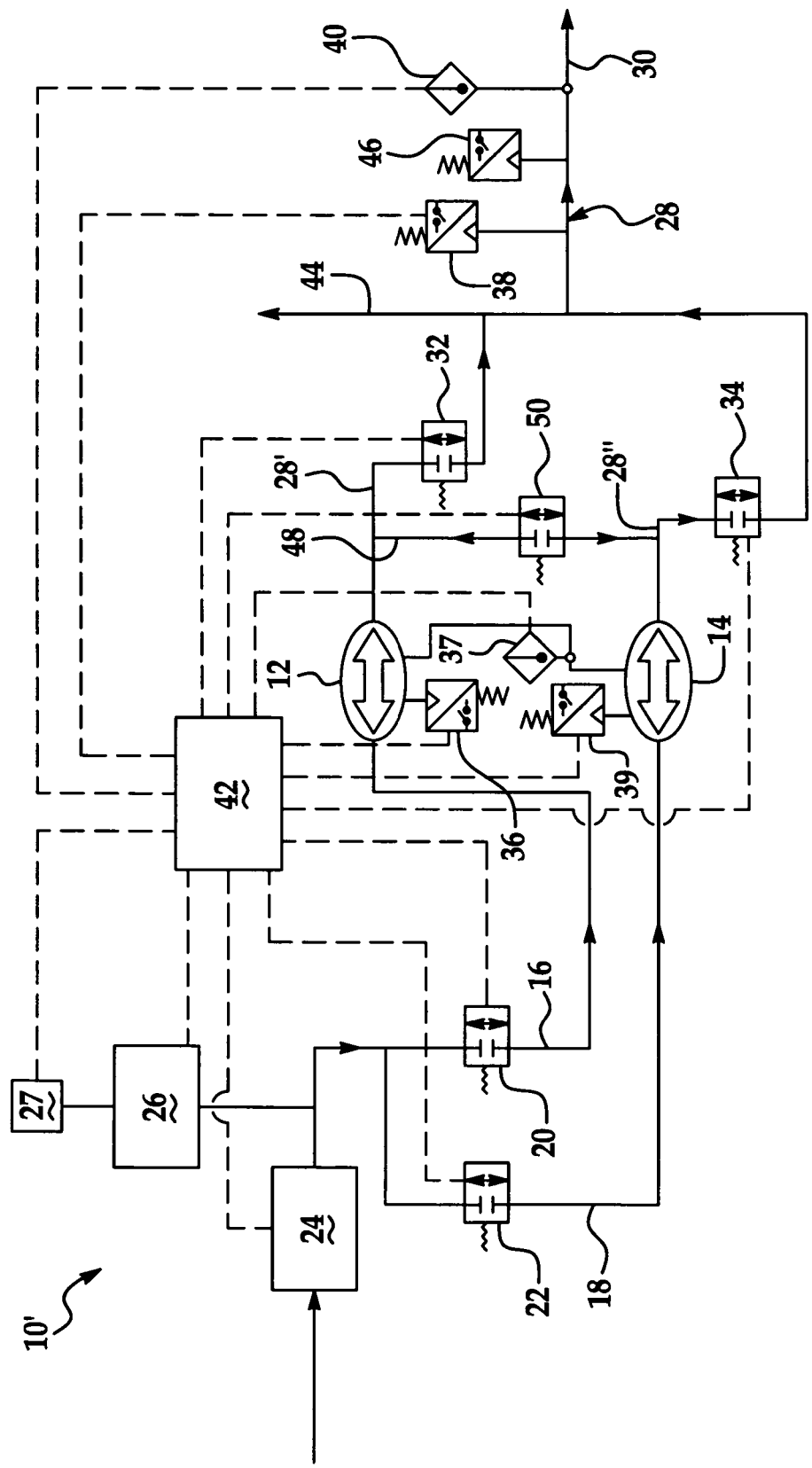
FIG. 2 is a schematic diagram of another embodiment of an oxygen delivery system including two sieve beds.
Figure 3:
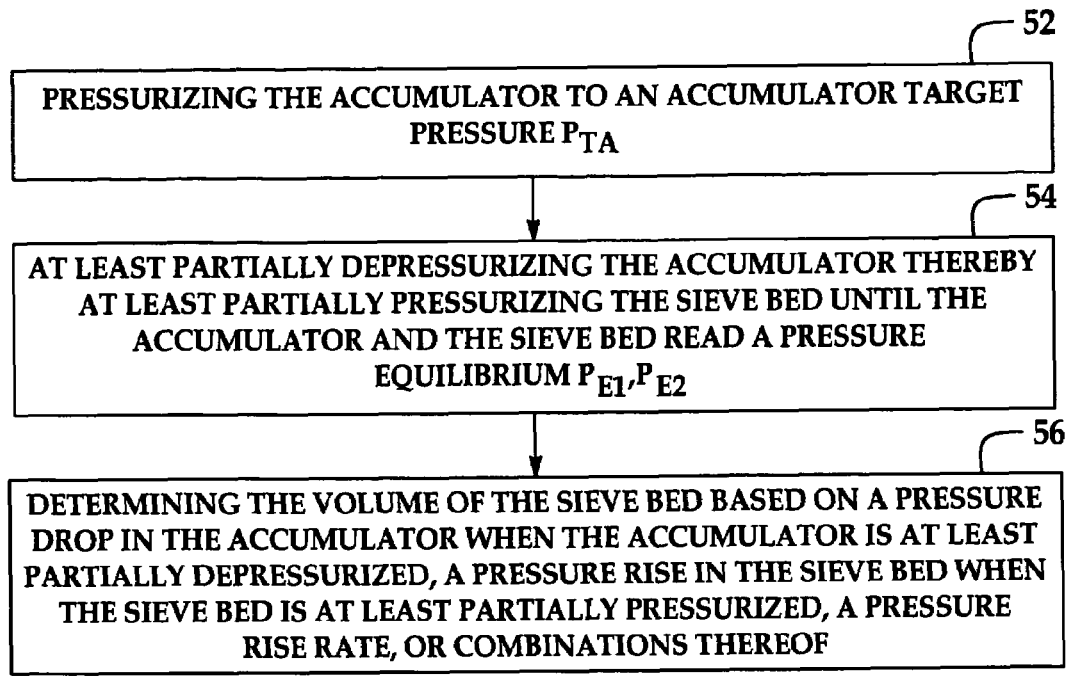
FIG. 3 is a flow diagram of an embodiment of the method of inferring an effective volume of one of the two sieve beds of the oxygen delivery system of FIG. 2.
Figure 4:
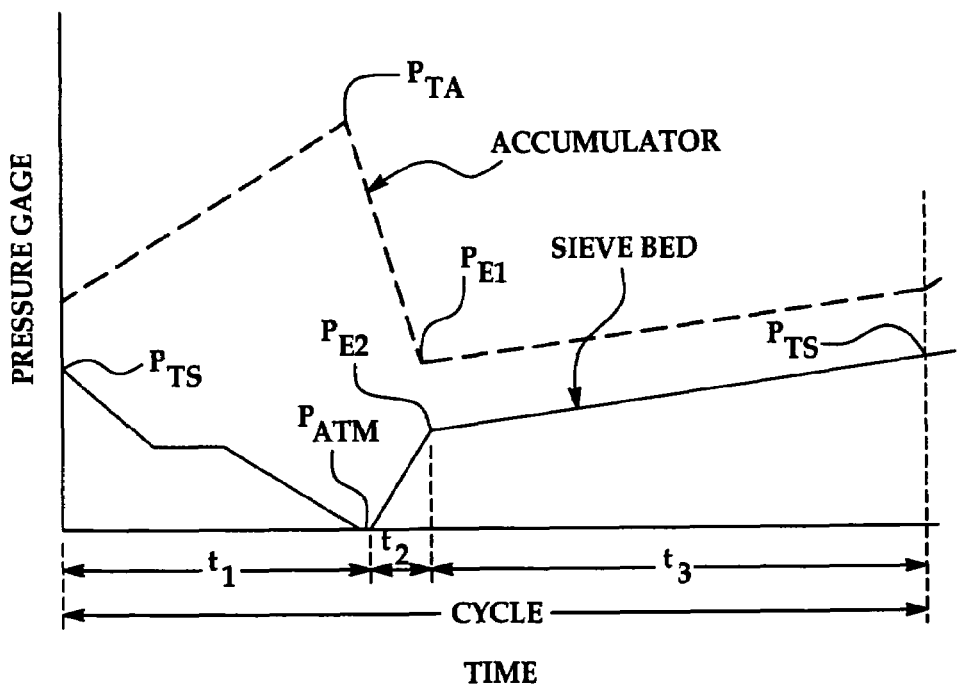
FIG. 4 is a graphical representation of the embodiment depicted in FIG. 3.

Another embodiment of inferring the effective volume of the sieve bed (e.g., the sieve bed 12) is described herein with reference now to FIGS. 2-4. For purposes of illustrating this embodiment, the sieve bed 14 will be used to describe a pressurization portion of the method, while the sieve bed 12 will be used to describe a depressurization portion of the method.

As shown in FIG. 2, this embodiment uses an accumulator 26 operatively connected to the compressor 24 in the oxygen delivery system 10', and an accumulator pressure sensor 27 operatively connected to the accumulator 26. In addition to the elements described above, the controller 42 also controls the accumulator 26 and the accumulator pressure sensor 27. The accumulator 26 is, e.g., a tank or reservoir configured to receive pressurized feed gas from the compressor 24. In a non-limiting example, the accumulator 26 is disposed in the oxygen delivery system 10 prior to the first 16 or second 18 supply conduits.

During counterfilling of the sieve bed 12 to the sieve bed 14 (at time $t_1$), this embodiment of the method includes pressurizing the accumulator 26 to an accumulator target pressure $P_{TA}$ (as shown by reference numeral 52). With the supply valves 20, 22 closed, the accumulator 26 is pressurized to the target pressure $P_{TA}$ via the compressor 24. In an embodiment, the target pressure $P_{TA}$ is determined via the controller 42, where such determination is based on predetermined settings for the delivery device 10, the barometric (ambient) pressure, and the temperature of the sieve bed 12.

As the accumulator is pressurized to the target pressure $P_{TA}$, the sieve bed 12 (which was pressurized during the previous PSA cycle) is depressurized to an equalization pressure $P_{EQ}$ between the sieve beds 12 and 14. Thereafter, the sieve bed 12 is further depressurized to about atmospheric pressure $P_{ATM}$. If, e.g., the oxygen delivery device includes only one sieve bed, then the sieve bed would be depressurized to about atmospheric pressure. At the time of depressurizing the sieve bed 12 to about atmospheric pressure ($t_1$), the adsorbed nitrogen is released from the sieve bed 12 and vented through the vent conduit 44.

Once the sieve bed 12 has been depressurized and the adsorbed nitrogen has been vented, the method further includes (at time $t_2$) at least partially depressurizing the accumulator 26 thereby at least partially pressurizing the sieve bed 14 until the accumulator 26 and the sieve bed 14 reach a pressure equilibrium $P_{E1}$, $P_{E2}$ (as shown by reference numeral 54). This is accomplished by opening the supply valve 22 and expelling the pressurized gas from the accumulator 26 into the sieve bed 14.

When substantially all of the gas is expelled from the accumulator 26 (at time $t_3$), the compressor 24 continues to supply pressurized feed gas to the sieve bed 14, thereby substantially filling the sieve bed 14. As the sieve bed 14 is filled, the pressure of the sieve bed increases until the sieve bed 14 reaches a sieve bed target pressure $P_{TS}$. Also, as the pressure increases in the sieve bed 14, nitrogen gas present in the feed gas is adsorbed by the nitrogen-adsorbing material.

Pressurizing the accumulator 26, the sieve bed 12, the sieve bed 14, or all of the above may be regulated by controlling the speed of the compressor 24. In some instances, the compressor 24 is controlled by calibrating the compressor 24 to operate at a speed suitable to achieve the desired pressures (for instance, with a known displacement or fixed displacement compressor). In an alternate embodiment, a pressure transducer on the accumulator may be used to substantially ensure desired pressure charge.

The method further includes inferring the effective volume of the sieve bed based on a pressure drop or decline in the accumulator 26 when the accumulator 26 is at least partially depressurized, a pressure rise in the sieve bed 14 when the sieve bed 14 is at least partially pressurized, a pressure rise rate, evaluation of the area beneath the curve for the fill or vent cycles, or combinations thereof (as shown by reference numeral 56). Any, or a combination of these methods allow one to infer the capacity, and therefore the contamination level, of the respective sieve bed. The pressure drop in the accumulator 26 is generally determined from the difference between the target pressure of the accumulator $P_{TA}$ and the equilibrium pressure $P_{E1}$ if the accumulator 26 is substantially completely depressurized. In the event that the accumulator 26 does not substantially completely depressurize, the pressure drop may be determined from a rate of decay during the time in which the equilibrium pressure $P_{E1}$ is reached while the accumulator 26 is depressurizing. The pressure rise in the sieve bed 12 is determined from the difference between the target pressure of the sieve bed $P_{TS}$ and the equilibrium pressure $P_{E2}$. The pressure rise rate is determined from a sieve bed pressure waveform representing pressure measurements of the sieve bed 12 over an amount of time. Time from one wave to another is usually known as the "period," and it includes both rise and fall times. The time from the nadir to the peak is the pressure rise time.

In the event that the sieve bed is considered to be contaminated by either of the exemplary methods provided above, an alarm is generated to indicate the contamination state of the sieve bed. In a non-limiting example, the alarm may be a visual alarm such as, e.g., an illuminated LED light on a control panel or user interface (not shown in FIG. 1) of the device 10, an alphanumeric or graphical indicia displayed on the user interface, and/or the like. In another non-limiting example, the alarm may be an acoustic alarm such as, e.g., a periodic beep, a continuous siren, a verbal warning, and/or the like. In yet another non-limiting example, the alarm may be a combination of a visual and an acoustic alarm. In still another non-limiting example, the alarm may be communicated to the user or to a third party via a wired or a wireless communication means.

It is to be understood that the example method provided above may be used for a single sieve bed oxygen delivery system or for a multi-sieve bed oxygen delivery system. It is further to be understood that, for multi-sieve bed systems, the method is applied to some or all of the sieve beds in the oxygen delivery system. For example, if three or more sieve beds are used, the three or more sieve beds may be alternately pressurized, depressurized, and counterfilled.

While several embodiments have been described in detail, it will be apparent to those skilled in the art that the disclosed embodiments may be modified. Therefore, the foregoing description is to be considered exemplary rather than limiting.

What is claimed is:

1. A method of determining the purity of oxygen present in an oxygen-enriched gas produced from an oxygen delivery device, the oxygen delivery device including at least one sieve bed having a nitrogen-adsorbing material disposed therein and configured to adsorb nitrogen from a feed gas introduced into the at least one sieve bed via a pressure-swing adsorption cycle, the feed gas including at least nitrogen and oxygen, the method comprising:
    determining a quantity of nitrogen adsorbed by the nitrogen-adsorbing material by inferring an effective volume of the at least one sieve bed based on a pressure change of the at least one sieve bed.

2. The method as defined in claim 1 wherein the purity of the oxygen present in the oxygen-enriched gas is determined from determining whether the at least one sieve bed is contaminated.

3. The method as defined in claim 2 wherein whether the at least one sieve bed is contaminated is determined by observing the rate of the pressure change of the at least one sieve bed over a period of time.

4. The method as defined in claim 1 wherein the oxygen delivery device includes an accumulator, and wherein inferring the effective volume of the at least one sieve bed is accomplished by:
    pressurizing the accumulator to a target pressure;
    at least partially depressurizing the accumulator thereby at least partially pressurizing the at least one sieve bed, until the accumulator and the at least one sieve bed reach a pressure equilibrium state; and
    determining the volume of the sieve bed based on a pressure drop in the accumulator when the accumulator is at least partially depressurized, a pressure rise in the sieve bed when the sieve bed is at least partially pressurized, a pressure rise rate, a pressure decay rate, or combinations thereof.

5. The method as defined in claim 4 wherein the effective volume of the sieve bed is correlated to a storing capacity for nitrogen therein, thereby indicating the quantity of nitrogen adsorbed by the nitrogen-adsorbing material.

6. The method as defined in claim 4 wherein the oxygen delivery device includes a compressor, and wherein pressurizing of the accumulator, the at least one sieve bed, or a combination thereof is regulated by controlling the speed of the compressor.

7. The method as defined in claim 4 wherein:
    pressurizing the accumulator occurs during a counterfilling stage of the pressure-swing adsorption cycle; and
    at least partially depressurizing the accumulator occurs during a sieve bed filling stage of the pressure-swing adsorption cycle.

8. The method as defined in claim 1 wherein, when the at least one sieve bed returns to substantially ambient pressure after venting of the pressure-swing adsorption cycle, inferring the effective volume of the sieve bed is accomplished by measuring a rate of pressure decay of the at least one sieve bed during the venting of the pressure-swing adsorption cycle.

9. The method as defined in claim 8 wherein the venting of the pressure-swing adsorption cycle includes discharging the oxygen-enriched product including the non-adsorbed nitrogen from the at least one sieve bed; and wherein discharging is modeled as a sieve bed pressure curve during the venting, the sieve bed pressure curve defining a time constant.

10. The method as defined in claim 9 wherein the time constant is dependent on: at least one flow restriction during the venting stage, the at least one flow restriction including at least one valve, at least one fluid communication path, and combinations thereof; a peak absolute pressure at the onset of the venting stage; the quantity of nitrogen adsorbed by the nitrogen-adsorbing material at the peak absolute pressure; a gas temperature; and a barometric pressure.

11. The method as defined in claim 9 wherein the time constant is determined by:
    measuring a plurality of sieve bed pressures at various time periods;
    generating the sieve bed pressure curve from the plurality of sieve bed pressures; and
    determine the slope of the sieve bed pressure curve;
    wherein the time constant is proportional to the quantity of nitrogen adsorbed by the nitrogen-adsorbing material.

12. The method as defined in claim 9 wherein a determination of whether the quantity of nitrogen adsorbed by the nitrogen-adsorbing material is sufficient to achieve a desired oxygen purity level is accomplished by comparing the time constant with a predicted value.

13. The method as defined in claim 12 wherein:
    if the predicted value exceeds the time constant by a failure threshold, then the quantity of nitrogen adsorbed is insufficient to achieve the desired oxygen purity level and the sieve bed is considered to be contaminated; and
    if the predicted value does not exceed the time constant by a failure threshold, then the quantity of nitrogen adsorbed is sufficient to achieve the desired oxygen purity level and the sieve bed is not considered to be contaminated.

14. The method as defined in claim 13 wherein the time constant is a time constant average from at least two sieve beds, and wherein if the predicted value exceeds the averaged time constant by a failure threshold, then the quantity of nitrogen adsorbed is insufficient to achieve the desired oxygen purity level, and the at least two sieve beds are considered to be contaminated; and
    if the predicted value does not exceed the averaged time constant by a failure threshold, then the quantity of nitrogen adsorbed is sufficient to achieve the desired oxygen purity level, and the at least two sieve beds are not considered to be contaminated.

15. The method as defined in claim 13 wherein, if the sieve bed is considered to be contaminated, the method further includes generating an alarm to indicate that the sieve bed is contaminated.

16. The method as defined in claim 15 wherein the alarm is selected from visual alarms, acoustic alarms, remote communications alarms, or combinations thereof.

17. The method as defined in claim 12 wherein the predicted value is determined by:
 obtaining a plurality of data points taken from model oxygen delivery devices, each model oxygen delivery device being operated at different sieve bed temperatures, sieve bed pressures, and altitudes; and
 applying a regression analysis to the plurality of data points to generate a mathematical expression for the predicted value.

18. The method as defined in claim 1 wherein the oxygen delivery device does not include an oxygen sensor.

* * * * *